United States Patent
Wu et al.

(10) Patent No.: US 11,710,345 B2
(45) Date of Patent: Jul. 25, 2023

(54) DRIVER LOGIN SYSTEM

(71) Applicant: VIA TECHNOLOGIES, INC., New Taipei (TW)

(72) Inventors: TsungHsien Wu, New Taipei (TW); Hung-Pin Chen, New Taipei (TW); Chia-Wei Huang, New Taipei (TW); Michael Andrew Fox, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 208 days.

(21) Appl. No.: 17/194,360

(22) Filed: Mar. 8, 2021

(65) Prior Publication Data

US 2021/0397820 A1 Dec. 23, 2021

Related U.S. Application Data

(60) Provisional application No. 63/051,953, filed on Jul. 15, 2020, provisional application No. 63/042,043, filed on Jun. 22, 2020.

(30) Foreign Application Priority Data

Nov. 23, 2020 (TW) .................................. 109140940

(51) Int. Cl.
*G06V 40/16* (2022.01)
*G06K 7/14* (2006.01)

(52) U.S. Cl.
CPC .......... *G06V 40/172* (2022.01); *G06K 7/1417* (2013.01); *G06V 40/166* (2022.01); *G06V 40/168* (2022.01)

(58) Field of Classification Search
CPC .. G06V 40/172; G06V 40/166; G06V 40/168; G06V 40/16; G06V 20/593;
(Continued)

(56) References Cited

U.S. PATENT DOCUMENTS

| | | | |
|---|---|---|---|
| 2014/0063249 A1* | 3/2014 | Miller | G06V 20/56 382/104 |
| 2015/0163448 A1* | 6/2015 | Khandpur | G06V 40/16 348/77 |
| 2017/0124987 A1* | 5/2017 | Kim | B60K 35/00 |
| 2021/0241617 A1* | 8/2021 | Matsugi | G06V 20/59 |
| 2021/0264135 A1* | 8/2021 | Whitelaw | H04L 63/0861 |

FOREIGN PATENT DOCUMENTS

| | | |
|---|---|---|
| CN | 107004128 | 8/2017 |
| CN | 107637015 | 1/2018 |

(Continued)

*Primary Examiner* — Nimesh Patel
(74) *Attorney, Agent, or Firm* — WPAT, PC

(57) ABSTRACT

A driver login device includes: a network communication unit in communication with the server via a network; an image pickup device capturing a target to obtain a login data; an image processing unit electrically coupled to the image pickup unit, and receiving and processing the login data to obtain a digital data; and a central processing unit electrically coupled to the network communication unit, the image pickup device and the image processing unit. The central processing unit, by way of the network communication unit, receives the data of the driver from the server via the network, controls the image pickup device to capture the target, comparing the digital data with the data of the driver to generate a comparing result, and by way of the network communication unit, transmitting the comparing result back to the server via the network.

19 Claims, 6 Drawing Sheets

(58) Field of Classification Search
CPC ...... G06V 10/82; G06V 10/70; G06V 10/776; G06V 20/20; G06V 20/52; G06V 40/113; G06V 40/19; G06V 40/162; G06V 40/50; G06K 7/1417; H04L 67/12; H04L 63/0861; G06N 20/00; G06N 3/02; G06N 3/126; G06N 7/005; G06N 3/08; G06N 3/0436; G06N 20/20; G06N 5/022; G06N 3/04; G06N 5/025; G06F 16/90344; G06F 3/016; G06F 3/0481; G06F 16/278; G06F 2221/2117; G06F 3/011; G06F 3/012; G06F 3/013; G06F 3/017; G06F 3/147; G06F 7/02; H04W 4/38; H04W 4/70; H04W 12/06; H04W 12/77; H04W 64/00; H04W 12/068; H04W 4/023; G06T 2207/20081; G06T 2207/20084; G06T 2207/30168; G06T 2207/10016; G06T 2207/30232; G06T 7/70; G06T 2207/10028; G06T 7/55

See application file for complete search history.

(56) References Cited

FOREIGN PATENT DOCUMENTS

| | | |
|---|---|---|
| CN | 107832680 | 3/2018 |
| TW | M387297 | 8/2010 |
| TW | M507875 | 9/2015 |
| TW | 201719563 | 6/2017 |
| TW | 201901545 | 1/2019 |

\* cited by examiner

DRIVER LOGIN SYSTEM

CROSS-REFERENCE TO RELATED APPLICATIONS

The present application is a nonprovisional application claiming benefit from a prior-filed provisional application bearing a Ser. No. 63/042,043 and filed Jun. 22, 2020 and another prior-filed provisional application bearing a Ser. No. 63/051,953 and filed Jul. 15, 2020, the entities of which are incorporated herein for reference.

FIELD OF THE INVENTION

The present invention relates to a login system, and more particular to a driver login system. The present invention also relates a driver login device and a driver login method used in the driver login system.

BACKGROUND OF THE INVENTION

For efficiently dispatching drivers and assuring of driving safety, it is critical for companies that provide professional driving services to monitor and control working hours of drivers, and it is preferred to always assign a familiar car to a driver. Conventionally, the above-mentioned coordination is conducted between a company and associated drivers by way of telecommunication such as phones or walkie-talkie devices. With such devices, it is hard to monitor real-time situations of drivers, e.g. at work or at rest, and it is not feasible to control the pairing relationship between drivers and cars.

SUMMARY OF THE INVENTION

Therefore, an object of the present invention is to automatically capture real-time images from a vehicle at specified time points, and determine working status of a driver in the vehicle based on the captured images.

An aspect of the present invention relates to a driver login system, which comprises a server and a driver login device. The server stores therein a data of a driver. The driver login device includes: a network communication unit in communication with the server via a network; an image pickup device capturing a target to obtain a first login data; an image processing unit electrically coupled to the image pickup unit, and receiving and processing the first login data to obtain a first digital data corresponding to the first login data; and a central processing unit electrically coupled to the network communication unit, the image pickup device and the image processing unit, wherein the central processing unit, by way of the network communication unit, receives the data of the driver from the server via the network, controls the image pickup device to capture the target, comparing the first digital data obtained from the image pickup device with the data of the driver to generate a first comparing result, and by way of the network communication unit, transmitting the first comparing result back to the server via the network.

Another aspect of the present invention relates to a driver login device, which comprises: a network communication unit for connecting to a network; an image pickup device capturing a target to obtain a first login data; an image processing unit electrically coupled to the image pickup unit, and receiving and processing the first login data to obtain a first digital data corresponding to the first login data; and a central processing unit electrically coupled to the network communication unit, the image pickup device and the image processing unit, wherein the central processing unit receives a data corresponding to a driver by way of the network communication unit via the network, controls the image pickup device to capture the target, comparing the first digital data obtained from the image pickup device with the data of the driver to generate a first comparing result, and by way of the network communication unit, transmitting out the first comparing result by way of the network communication unit.

A further aspect of the present invention relates to a driver login method, which comprises: capturing a target to obtain a login data; processing the login data to obtain a digital data; retrieving a data of a driver from a server; and comparing the first digital data with the data of the driver to generate a first comparing result; and transmitting the first comparing result out.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
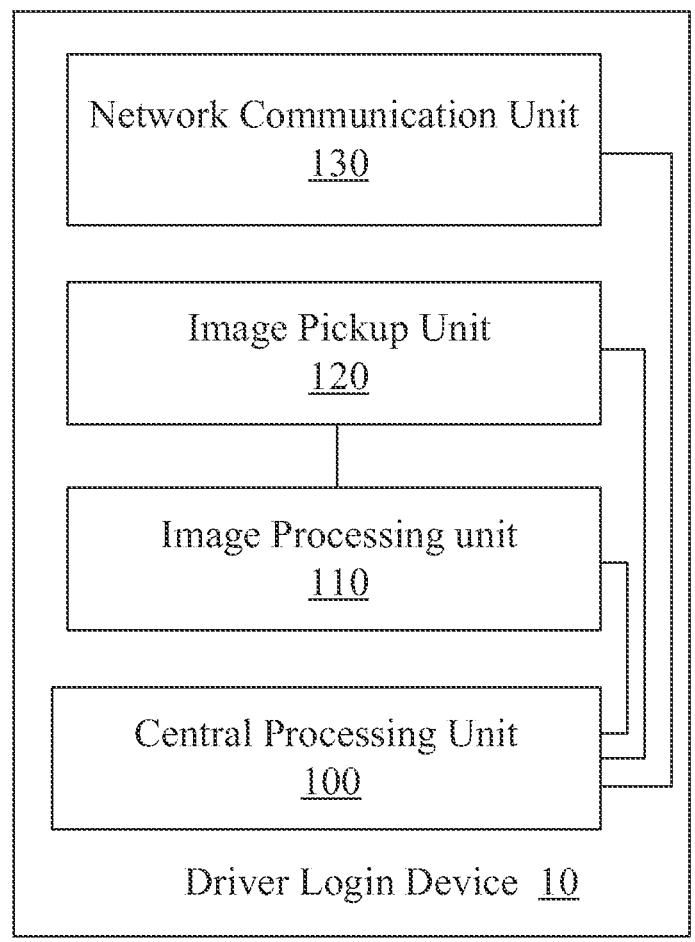
FIG. 1A is a schematic circuit block diagram illustrating a driver login device according to an embodiment of the present invention.

For well managing a fleet or fleets, a driver registration system binding vehicles and drivers is established. In each of the vehicles, a driver login device is equipped to monitor and record the working status of a driver who is using the vehicle. Please refer to FIG. 1A. A driver login device 10 includes a central processing unit 100, an image processing unit 110, an image pickup unit 120 and a network communication unit 130. The image processing unit 110, the image pickup unit 120 and the network communication unit 130 are in communication with the central processing unit 100. The central processing unit 100 executes an operating system and proper software to control operations of the units of the driver login device 10 by issuing various kinds of commands.

The network communication unit 130 is communicable with a network in a wired or wireless manner, and via the network, communicable with other units or devices where specific data or information are available. The network may be Intranet or Internet. For example, when a specific data is required, the central processing unit 100 issues a command to the network communication device 130, which then accesses the required data from one of the units or devices accordingly. After obtaining the required data, the network communication device 130 reports back to the central processing unit 100 and performs next operation according to a rule stipulated in the current command or in response to a new command from the central processing unit 100. For example, next operation to be performed may be an operation of storing the obtained data into a designated storage device (not shown) or forwarding the obtained data to an internal unit of the driver login device 10. It is understood by those skilled in the art that the above operations can be achieved by installing a bus (not shown) in communication with the internal units.

For example, the network communication unit 130 is wirelessly connected to the Internet, and via the Internet, the network communication unit 130 can access Cloud to obtain identity data of specified drivers, who are bound to the vehicle as well as the driver login device 10. For exemplification only, ID information of five drivers may be previously bound to the same vehicle, and the command issued by the central processing unit 100 to the network communication device 130 is to acquire the ID information of the five drivers from Cloud via the network communication device 130 and provide the ID information for the central processing unit 100 to execute an identifying operation of the current driver of the vehicle, in which the driver login device 10 is installed.

For identifying the current driver, the image pickup unit 120 captures an image of a target related to the current driver. The type of the target may vary in different embodiments. For example, it may be a Quick Response Code (QR Code) specific to the driver or a face area of the driver. Of course, the target may include more than one type of feature or more than one object for flexible operations or double check. Hereinafter, an example that the target includes an QR Code and a face area of the driver is given for illustration. Therefore, the image pickup unit 120 is installed at a proper location in the vehicle, where a QR-Code carrier, e.g. a mobile phone or a QR-Code sheet holder, and a face area of the driver can be targeted. In this embodiment, the image pickup unit 120 includes two camera elements, one of which is oriented to a seat of the driver and preset to be at a certain level, and the other of which is oriented to a seat of the mobile phone or the QR-Code sheet holder. Alternatively, it is feasible to use a single camera element with a relatively large capturing area or an automatically adjustable scanning function to sequentially catch images of the QR Code and the face area of the driver. The image of the QR Code, the image of the face area, a feature vector derived from the image of the face area, e.g. a facial characteristic, or a combination of the aforementioned factors is defined as a login data.

The login data obtained by the image pickup unit 120 is then transmitted to the image processing unit 110. The image processing unit 110 performs image processing to convert the login data into a digital data. For example, a facial characteristic data is extracted by the image processing unit 110 from the face area image of the driver captured by one of the camera devices, and a QR Code is read by the image processing unit 110 from the QR-Code image of the driver captured by the other one of the camera devices. Accordingly, different types of digital data are generated by the image processing unit 110. The different types of digital data are then transmitted to the central processing unit 100 to be compared with respective identity data, which are obtained from one or more of the associated units, e.g. Cloud, via the network communication device 130. The respective identity data include the facial characteristic data of the drivers bound to this vehicle as well as this login device and the QR Codes specific to the drivers. According to the comparing results, whether the current driver is a registered one of the drivers bound to the vehicle can be determined, and meanwhile, the current driver, if registered, can be recognized. The comparing results can also be transmitted out of the driver login device 10 via the network communication device 130 and the network to any proper one of the associated units of devices. For example, the comparing results may be transmitted to a manager's computer or smart phone, or transmitted to Cloud to be monitored, processed and/or stored.

It is to be noted that in the case that a single camera device is used for capturing images of either the QR Code or the face area of the driver, the obtained login data may be transmitted to the image processing unit 110 without being classified as a QR Code or a face area in advance. The image processing unit 110 simultaneously executes a reading operation of the login data as a possible QR Code, and a scanning operation of the login data as a possible face area image and an extracting operation of the facial characteristic to see which process produces the digital data first. The identification of the current driver can be conducted with the QR Code, the face area image, or the facial characteristic, whichever is received by the image processing unit 110 or the central processing unit 100 first.

In the above embodiments, the identifying procedure is completed when the QR Code, the face image or the facial characteristic is determined to be consistent with the respective identity data. In an alternative embodiment, the identifying procedure is determined to be completed only when both of the QR Code and the face image or facial characteristic direct to the same driver.

Figure 1B:
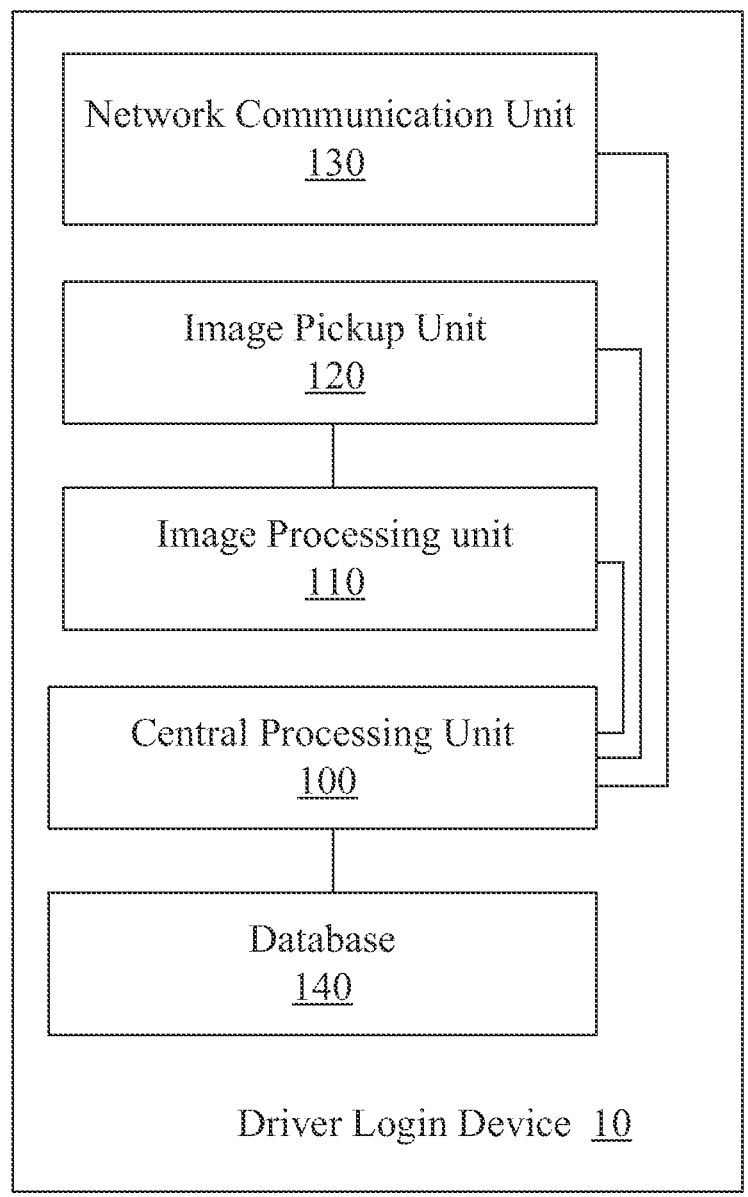
FIG. 1B is a schematic circuit block diagram illustrating a driver login device according to another embodiment of the present invention.

In the above embodiments, the identity data are obtained from one or more of the associated units or devices, e.g. Cloud, via the network communication device 130 and the network. Alternatively, the identity data may be accessed from a database 140 of the driver login device 10, as shown in FIG. 1B, by the central processing unit 100. In this embodiment, the central processing unit 100 accesses a specific type of identity data in response to the type of digital data received from the image processing unit 110. For example, if only the QR Code image is captured by the image pickup device 120, the central processing unit 100 accesses the identity data of QR Codes from the database for identification of the current driver. On the other hand, if only the face area image is captured by the image pickup device 120, the central processing unit 100 accesses the identity data of the face images or facial characteristics from the database for identification of the current driver. Furthermore, if the login data include both the QR Code and the face image or facial characteristic, the central processing unit 100 accesses the identity data of both the QR Codes and the face images or facial characteristics from the database for identification of the current driver. Nevertheless, the central processing unit 100 may also access only one of the identity data of the QR Codes, face images and facial characteristics from the database for identification of the current driver even if the login data include both the QR Code and the face image or facial characteristic.

It is to be noted that in the above embodiments, the identity data to be compared with are limited to those of a specified number of drivers, e.g. five drivers, who are previously bound to the specified vehicle. In another embodiment, the vehicle is not previously bound to any driver, and vice versa. Under this circumstance, the identity data of all the drivers registered in the driver registration system would be compared with in order to identify the current driver. The identifying procedures are similar to those described above. Optionally, the current driver, after being identified, can be checked by the central processing unit 100 to see if he is the one who is allowed to drive this vehicle, or the current driver can be bound to the vehicle at this stage and recorded in Cloud or the database.

In the above embodiments, the login data may include a QR Code, a face area image and/or a facial characteristic specific to the current driver, and thus the identity data to be compared with should include QR Codes, face area images and/or facial characteristic data correspondingly. In some embodiments, both the face area images and the facial characteristic data can be directly accessed from Cloud or the database, while in other embodiments, only can the face area images be directly accessed from Cloud or the database, but the facial characteristic data are derived from the face area images by the image processing unit 110. For example, the central processing unit 100 may transfer the face area images to the image processing unit 110 to extract the facial characteristic data with a neural network such as Convolutional Neural Network. Of course, the image processing unit 110 can also generate the facial characteristic data specific to the current driver from the face area image of the current driver with the same neural network. The derived facial characteristic data, in addition to being used for real-time comparison, may be transmitted back to Cloud or the database for subsequent uses.

Figure 2A:
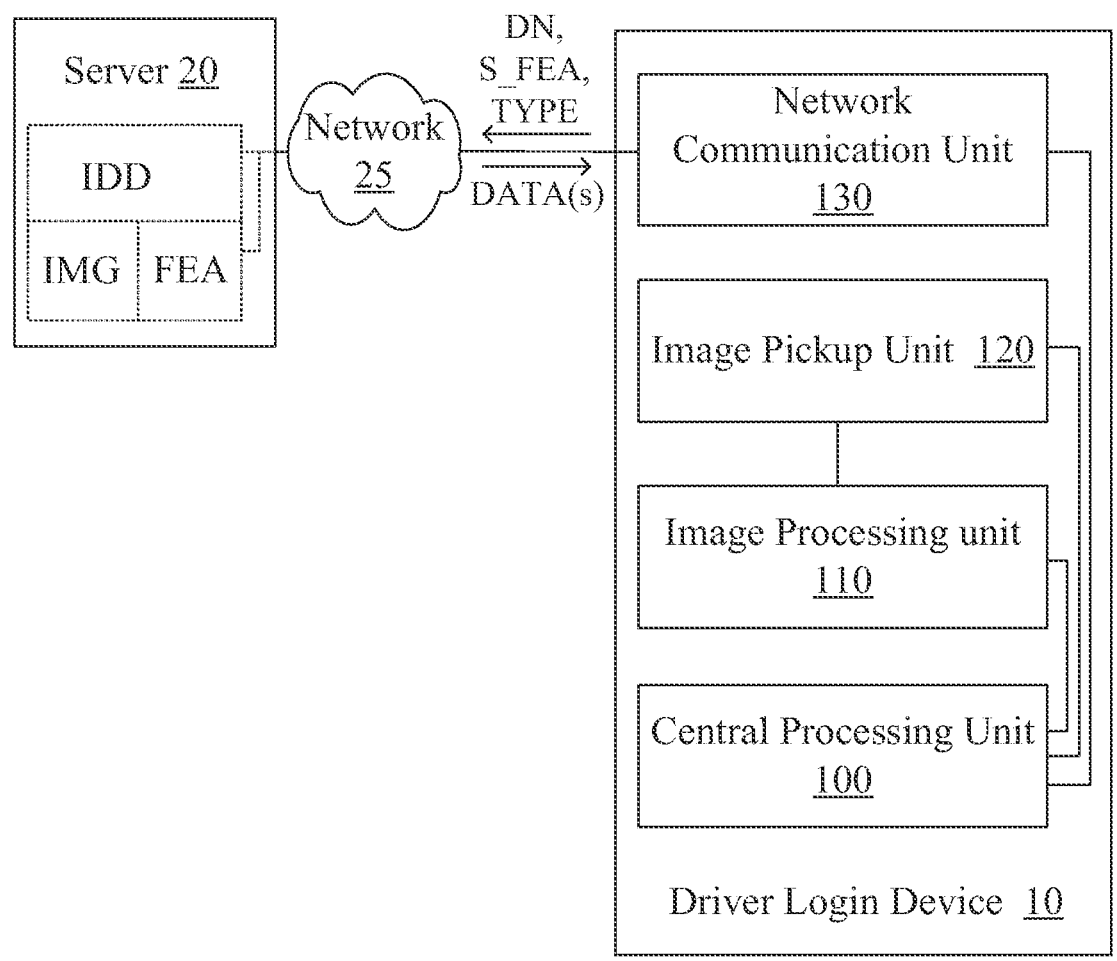
FIG. 2A is a scheme illustrating a driver login system according to an embodiment of the present invention.

The driver login device 10 or its equivalent variation as described above with reference to FIG. 1A may be used with a server 20 and suitable networking means, e.g. the Internet 25, to establish a driver login system, as illustrated in FIG. 2A. The server 20 stores therein ID information of a plurality of registered drivers. The ID information includes basic identity data IDD, face image data IMG, facial characteristic data FEA, or a combination of two or more of them. The basic identity data IDD, for example, can be presented in a form of QR Code or convertible into a form of QR Code, and is available for download.

When the driver login device 10 needs identity data of drivers for comparison, the central processing unit 100 may request identity data of each registered driver or identity data of a specific group of registered drivers from the server 20 via the network communication unit 130 depending on practical requirement. For example, for minimizing data transmission, the central processing unit 100 provides a registered number DN of the driver login device 10 to the server 20 via the network communication unit 130, and in response, the server 20 provides only the identity data of the drivers directly or indirectly bound to the specified driver login device 10.

Since a variety of facial characteristics FEA can be derived from the same face area image IMG by way of different image processing chips, it is practical to store only one or more face area images IMG instead of facial characteristics FEA in the server 20 at first for each registered driver. Afterwards, by accessing the face area images IMG of a specified driver when necessary and adaptively processing the face area images IMG into derived facial characteristics S_FEA, the database of the server 20 can be dynamically updated with incorporation of the facial characteristics S_FEA into the identity data of the specified driver. A set of facial characteristics FEA of the specified driver is thus established with gradually collected facial characteristics S_FEA. Furthermore, it is preferred to bind each of the facial characteristics S_FEA in the set of facial characteristics FEA to an image processing chip that generates the facial characteristic S_FEA. For example, all the facial characteristics S_FEA generated by an A-type image processing chip are bound to an X-group, and all the facial characteristics S_FEA generated by a B-type image processing chip are bound to a Y-group. Afterwards, when the driver login device 10 needs identity data of drivers for comparison, the central processing unit 100 can provide a type name of image processing chip to the server 20, then the server 20 can provide the specific group of facial characteristics corresponding to the type of image processing chip to the central processing unit 100 for comparison. In this embodiment, the identity data of specified drivers are bound to types of image processing chips instead of driver login devices. Therefore, as long as the same type of image processing chip is used, the identity data of specified drivers can be directly obtained from the server 20 even if a new driver login device is used.

Figure 2B:
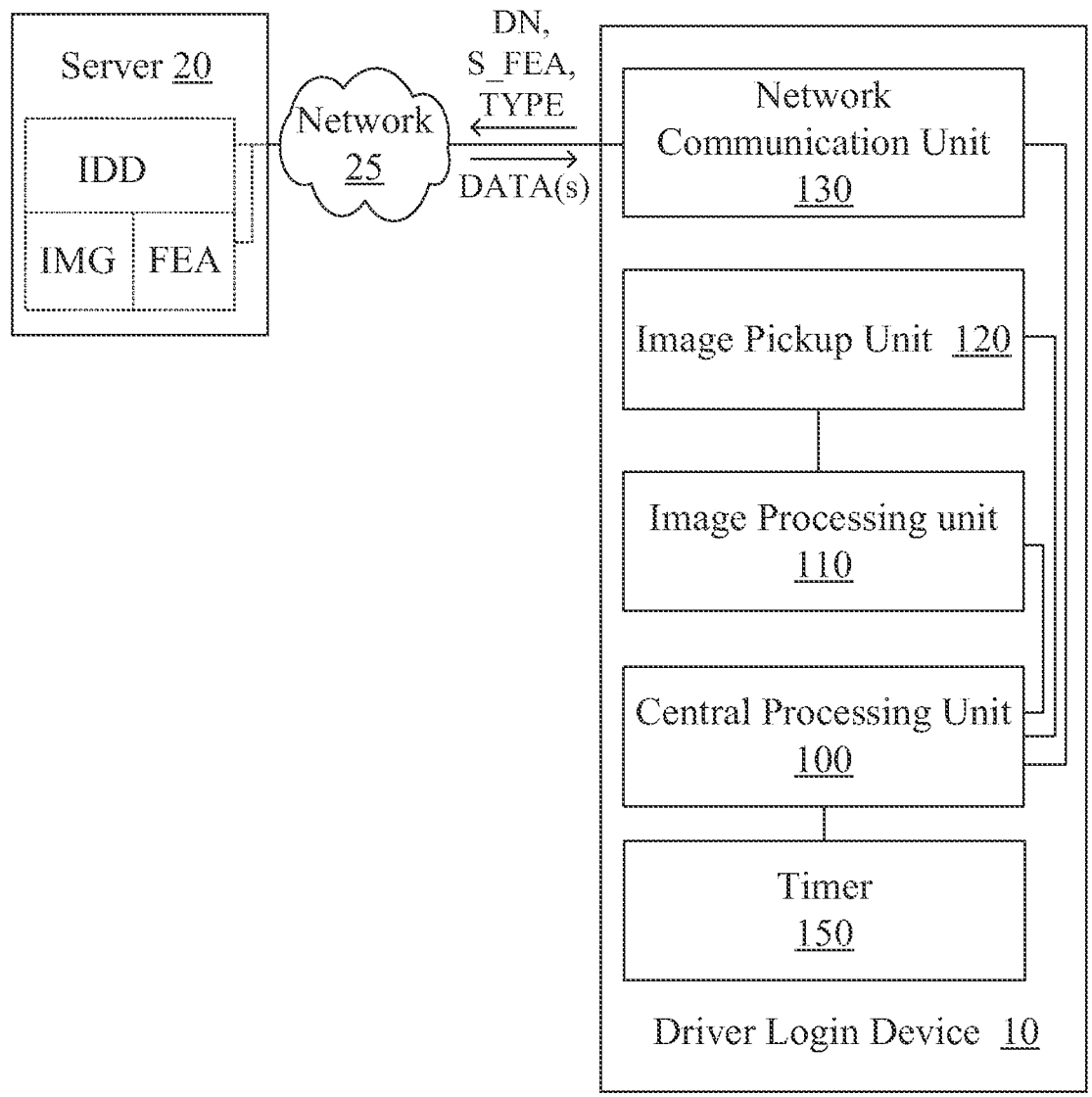
FIG. 2B is a scheme illustrating a driver login system according to another embodiment of the present invention.
Figure 2C:
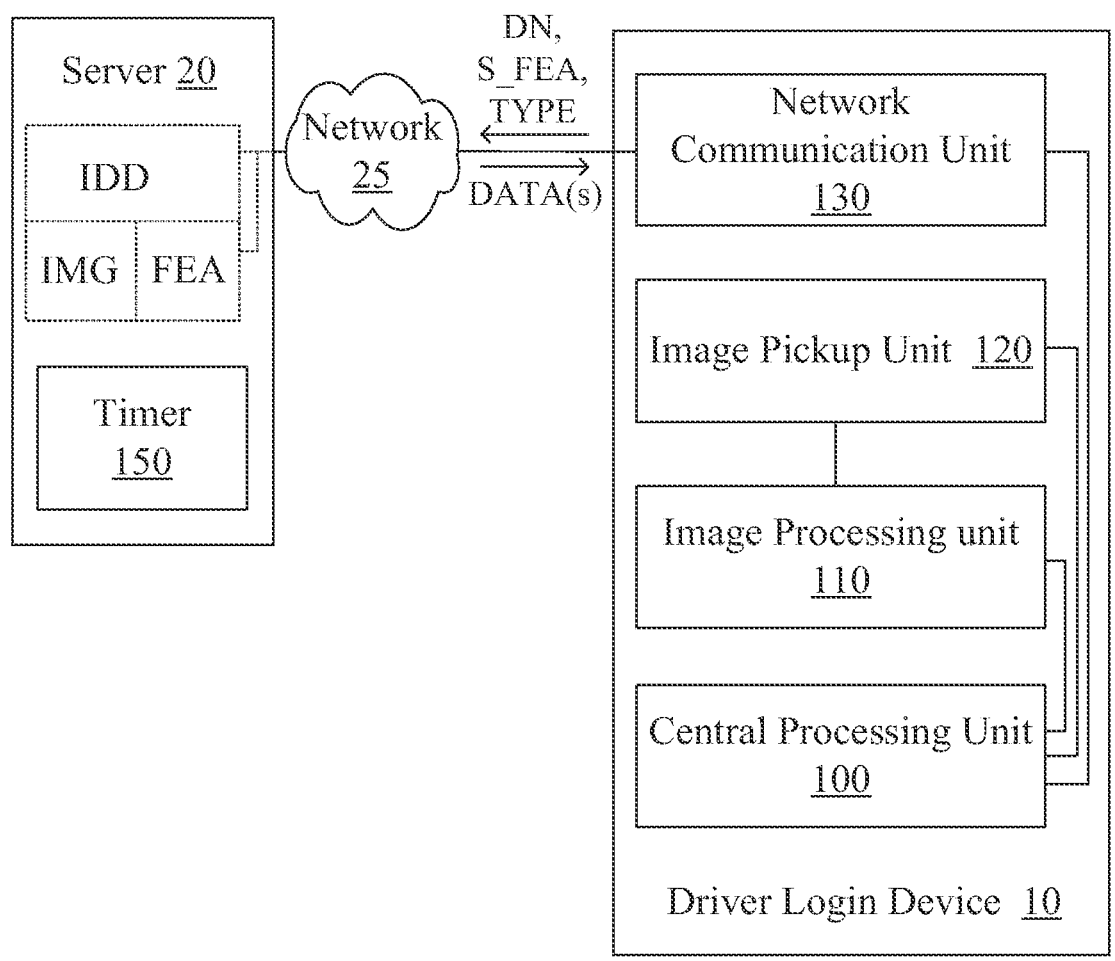
FIG. 2C is a scheme illustrating a driver login system according to a further embodiment of the present invention.

Furthermore, by further providing a timer 150 in the driver login device 10 (FIG. 2B) or the server 20 (FIG. 2C) to automatically obtain a renewed login data after a certain period of time, and by converting the renewed login data into a new digital data and comparing the new digital data with the identity data of drivers, it can be realized if the current driver is the same one as the preceding identified one.

Figure 3:
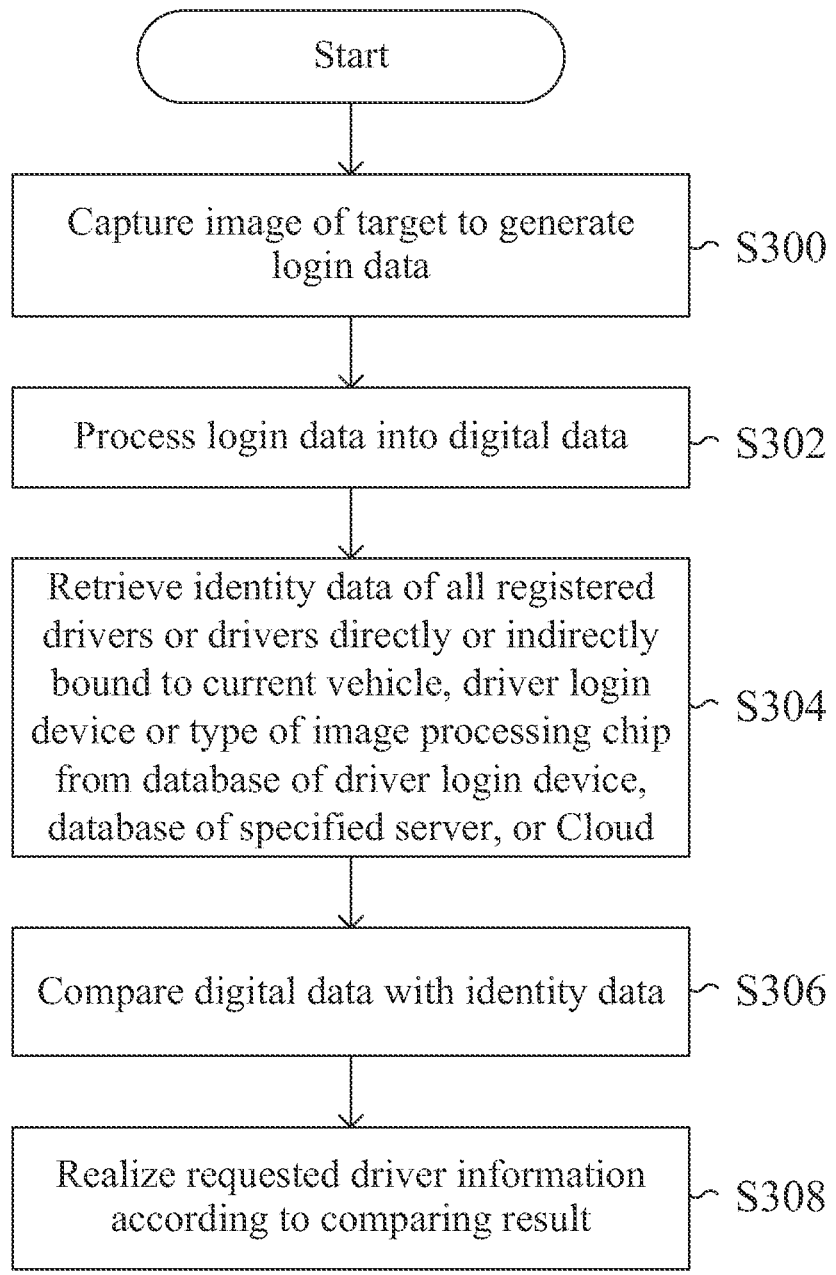
FIG. 3 is a flowchart schematically illustrating a driver login method according to an embodiment of the present invention.

FIG. 3 summarizes a driver login method executed with the driver login device in the driver login system described above. In Step S300, an image of a target is captured to generate a login data. The login data is then processed into a digital data (Step S302). Meanwhile, identity data of all registered drivers or drivers directly or indirectly bound to the vehicle, driver login device or type of image processing chip is retrieved from database of the driver login device, database of a specified server, or Cloud (Step S304). The digital data is compared with the identity data (Step S306) so as to realize requested driver information according to the comparing result (Step S308).

According to the above description, it is understood that the image pickup device can obtain live images at one or more specific time points, and compare the images or derived features with identity data accessible from proper database after image analysis so as to identify the current driver. By using the driver login device and driver login system according to the present invention, identity of the current driver and his working hours can be monitored. Furthermore, by dynamically collecting updated facial characteristics instead of using previously inputted ones, the probability of erroneous identification due to the use of different types of image processing chips can be ameliorated. Furthermore, by binding facial characteristics to types of image processing chips, the step of collecting facial characteristics needs not to be redundantly executed when a new driver login device is used.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driver login system, comprising:
a server stored therein a data of a driver; and
a driver login device, including:
a network communication unit in communication with the server via a network;
an image pickup device capturing at least one image of a target to obtain a first login data;
an image processing unit electrically coupled to the image pickup device, and receiving and processing the first login data to obtain a first digital data corresponding to the first login data; and
a central processing unit electrically coupled to the network communication unit, the image pickup device and the image processing unit,
wherein the central processing unit, by way of the network communication unit, receives the data of the driver from the server via the network, controls the image pickup device to capture the at least one image of the target, comparing the first digital data obtained from the image pickup device with the data of the driver to generate a first comparing result, and by way of the network communication unit, transmitting the first comparing result back to the server via the network, and
wherein after a preset period of time when the first digital data is obtained, the driver login device further captures the target to obtain a second login data correspondingly, compares the second login data with a second digital data, which is converted from the second login data by the image pickup device or adopts the data of the driver, to generating a second comparing result, and transmits the second comparing result to the server.

2. The driver login system according to claim 1, wherein the data of the driver includes an existent face-area image or an existent facial characteristic data of the driver.

3. The driver login system according to claim 2, wherein the target is a face of the driver, the first login data is a login image obtained by capturing an image of the face of the driver by the image pickup device, and the first digital data is a login facial characteristic data obtained by extracting a facial characteristic from the login image by the image processing unit.

4. The driver login system according to claim 2, wherein if the data of the driver is the existent face-area image but does not include the existent facial characteristic data of the driver, the central processing unit transmits the existent face-area image to the image processing unit and obtains a specific facial characteristic data by having the image processing unit extract a characteristic from the existent face-area image.

5. The driver login system according to claim 4, wherein the specific facial characteristic data is transmitted back to the server and subsequently used as a part of the existent facial characteristic data.

6. The driver login system according to claim 1, wherein the target is a Quick Response Code (QR Code).

7. The driver login system according to claim 6, wherein the image processing unit processes the first login data to perform interpretation of the QR Code and extract a facial characteristic at the same time.

8. A driver login device, including:
a network communication unit for connecting to a network;
an image pickup device capturing a target to obtain a first login data;
an image processing unit electrically coupled to the image pickup device unit, and receiving and processing the first login data to obtain a first digital data corresponding to the first login data; and
a central processing unit electrically coupled to the network communication unit, the image pickup device and the image processing unit, wherein the central processing unit receives a data corresponding to a driver by way of the network communication unit via the network, controls the image pickup device to capture the target, comparing the first digital data obtained from the image pickup device with the data of the driver to generate a first comparing result, and by way of the network communication unit, transmitting out the first comparing result by way of the network communication unit,
wherein after a preset period of time when the first digital data is obtained, the driver login device further captures the target to obtain a second login data correspondingly, compares the second login data with a second digital data, which is converted from the second login data by the image pickup device or adopts the data of the driver, to generating a second comparing result, and transmits the second comparing result to the server.

9. The driver login device according to claim 8, wherein the data of the driver includes an existent face-area image or an existent facial characteristic data of the driver.

10. The driver login device according to claim 9, wherein the target is a face of the driver, the first login data is a login image obtained by capturing the face of the driver by the image pickup device, and the first digital data is a login facial characteristic data obtained by extracting a facial characteristic from the login image by the image processing unit.

11. The driver login device according to claim 9, wherein if the data of the driver is the existent face-area image but does not include the existent facial characteristic data of the driver, the central processing unit transmits the existent face-area image to the image processing unit and obtains a specific facial characteristic data by having the image processing unit extract a characteristic from the existent face-area image.

12. The driver login device according to claim 11, wherein the specific facial characteristic data is transmitted out and subsequently used as a part of the existent facial characteristic data.

13. The driver login system according to claim 8, wherein the image processing unit processes the first login data to perform interpretation of a QR Code and extract a facial characteristic at the same time.

14. A driver login method, comprising:
capturing a target to obtain a first login data;
processing the first login data to obtain a first digital data;
retrieving a data of a driver from a server; and
comparing the first digital data with the data of the driver to generate a first comparing result; and
transmitting the first comparing result out,
wherein after a preset period of time when the first digital data is obtained, the driver login device further captures the target to obtain a second login data correspondingly, compares the second login data with a second digital data, which is converted from the second login data by the image pickup device or adopts the data of the driver, to generate a second comparing result, and transmits the second comparing result to the server.

15. The driver login method according to claim 14, wherein the data of the driver includes an existent face-area image or an existent facial characteristic data of the driver.

16. The driver login method according to claim 15, wherein the target is a face of the driver, the first login data is a login image obtained by capturing the face of the driver by the image pickup device, and the first digital data is a login facial characteristic data obtained by extracting a facial characteristic from the login image by the image processing unit.

17. The driver login method according to claim 15, wherein if the data of the driver is the existent face-area image but does not include the existent facial characteristic data of the driver, the central processing unit transmits the existent face-area image to the image processing unit and obtains a specific facial characteristic data by having the image processing unit extract a characteristic from the existent face-area image.

18. The driver login device according to claim 17, wherein the specific facial characteristic data is transmitted out and subsequently used as a part of the existent facial characteristic data.

19. The driver login method according to claim 14, wherein the image processing unit processes the first login data to perform interpretation of a QR Code and extract a facial characteristic at the same time.

\* \* \* \* \*